(12) United States Patent
Baruth

(10) Patent No.: US 8,626,606 B2
(45) Date of Patent: Jan. 7, 2014

(54) SYSTEMS AND METHODS TO TRANSMIT CONSUMER NOTIFICATIONS ASSOCIATED WITH PRINTED PUBLICATION RETAIL LOCATIONS

(75) Inventor: Seana Baruth, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 208 days.

(21) Appl. No.: 13/075,585

(22) Filed: Mar. 30, 2011

(65) Prior Publication Data
US 2012/0253969 A1 Oct. 4, 2012

(51) Int. Cl.
*G06Q 30/00* (2012.01)

(52) U.S. Cl.
USPC ........................................................ 705/26.7

(58) Field of Classification Search
USPC ............... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | | |
|---|---|---|---|---|
| 6,953,343 | B2 * | 10/2005 | Townshend | 434/178 |
| 8,370,348 | B1 * | 2/2013 | Reilly et al. | 707/731 |
| 2004/0133847 | A1 | 7/2004 | Iino et al. | |
| 2006/0111986 | A1 | 5/2006 | Yorke et al. | |
| 2006/0277185 | A1 * | 12/2006 | Sato et al. | 707/9 |
| 2007/0260671 | A1 * | 11/2007 | Harinstein et al. | 709/203 |
| 2008/0039163 | A1 | 2/2008 | Eronen et al. | |
| 2008/0077857 | A1 * | 3/2008 | Olson | 715/246 |
| 2008/0306935 | A1 | 12/2008 | Richardson et al. | |
| 2009/0024621 | A1 * | 1/2009 | Burgess et al. | 707/6 |
| 2009/0099916 | A1 | 4/2009 | Garbow et al. | |
| 2009/0150944 | A1 | 6/2009 | Fukushima et al. | |
| 2012/0030227 | A1 * | 2/2012 | Mital et al. | 707/767 |
| 2013/0166406 | A1 * | 6/2013 | Yardley et al. | 705/26.7 |

OTHER PUBLICATIONS

Randall Stross, "Someday, Store Coupons May Tap You on the Shoulder", Dec. 25, 2010, The New York Times, retrieved on Jan. 14, 2011, retrieved from http://www.nytimes.com/2010/12/26/business/26digi.html?_r=1&pagewanted=print, 3pgs.
"Best Iphone Apps Review", 2010, retrieved on Mar. 28, 2011, retrieved from http://www.bestiphoneappmatic.com, 7pgs.
Aaron OBrien, "Comic Book Pick List", Android Application v1.0.9, AndroLib, 2010, retrieved on Mar. 28, 2011, retrieved from http://www.androlib.com/android.application.com-flyingspheres-android-cbwr-jjqnE.aspx, 3pgs.
"ComicShopLocator", 2010, retrieved on Mar. 28, 2011, retrieved from http://www.comicshoplocator.com, 3pgs.
"The Zumobi Network Showcase", 2010, retrieved on Mar. 28, 2011, retrieved from http://www.zumobi.com/app_showcase, 8pgs.
Jen, "Marvel's iPad app almost makes me want one", Apr. 5, 2010, The Comic Book Nerd, retrieved on Mar. 28, 2011, retrieved from http://www.thecomicbooknerd.com/2010/04/05/marvels-ipad-app-almost-makes-me-want-one/, 9pgs.

* cited by examiner

*Primary Examiner* — Naeem Haq
(74) *Attorney, Agent, or Firm* — Buckley, Maschoff & Talwalkar LLC

(57) ABSTRACT

According to some embodiments, a central platform may receive one or more publication preferences associated with a consumer. Based on the publication preferences, the central platform may access a publication database to identify a publication potentially of interest to the consumer. At least one retail location where the identified publication may be currently available can be determined based at least in part on a current location associated with the consumer. A notification message may then be transmitted to a consumer device to indicate the at least one retail location.

21 Claims, 10 Drawing Sheets

SYSTEMS AND METHODS TO TRANSMIT CONSUMER NOTIFICATIONS ASSOCIATED WITH PRINTED PUBLICATION RETAIL LOCATIONS

FIELD

Some embodiments relate to mobile consumer devices and printed publications. More specifically, some embodiments provide consumer notifications via mobile consumer devices, wherein the notifications are associated with the availability of printed publications at nearby retail locations.

BACKGROUND

Printed publications may be made available for sale to consumers at various times. For example, a new comic book in a particular series might become available on a weekly or monthly basis. Moreover, different publication series typically become available on different schedules (e.g., on different days of the week or different dates in the month). As a result, it can be difficult for a consumer to remember or otherwise be aware that a new publication is available, especially when he or she is potentially interested in a substantial number of different publication series.

Moreover, a consumer may be interested in new publications that are written by a particular author, that were drawn by his or her favorite illustrator, and/or that feature a particular character (e.g., a villain). All of these factors can make it more difficult for the consumer to be aware when publications of interest become available. Further, even if a consumer is aware that a new publication of interest is available, he or she might not know where the publication is sold (e.g., when he or she is traveling in an unfamiliar town). In addition, there might be no simple way for the consumer to contact one or more retail locations (e.g., to ask whether or not a particular comic book is currently in stock).

Accordingly, methods and mechanisms to efficiently and automatically transmit consumer notifications associated with printed publication retail locations may be provided by some embodiments herein.

DETAILED DESCRIPTION

At various times, printed publications may be made available for sale to consumers. For example, a new comic book in a particular series might become available on a weekly or monthly basis. Moreover, different publication series typically become available on different schedules (e.g., on different days of the week or different dates in the month). As a result, it can be difficult for a consumer to remember or otherwise be aware that a publication is available, especially when he or she is potentially interested in a substantial number of different publication series.

Figure 1:
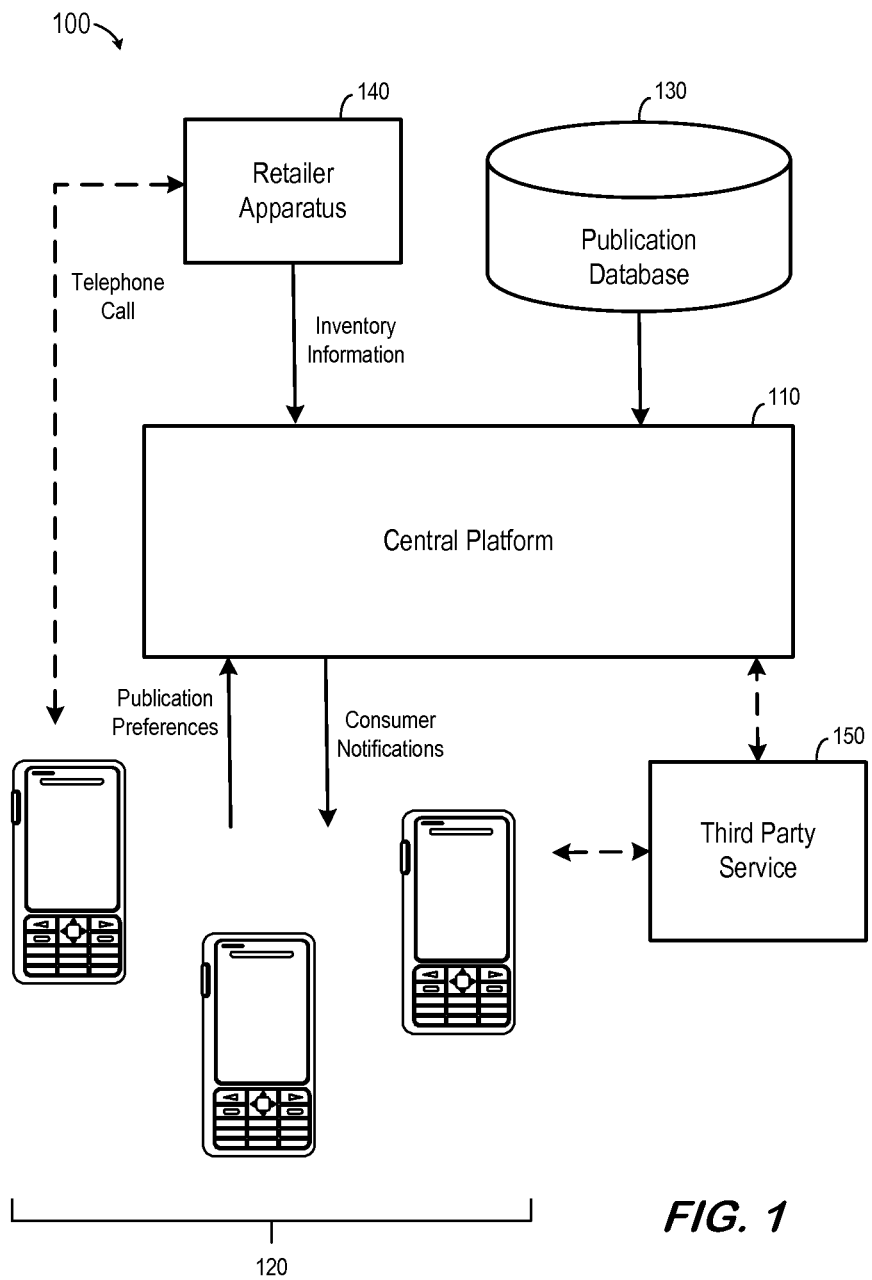
FIG. 1 is a block diagram of a system according to some embodiments.

FIG. 1 is a block diagram of a system 100 according to some embodiments. In particular, the system 100 includes a central platform 110 in communication with a number of mobile consumer devices 120. As used herein, the term "central platform" 110 may be associated with, for example, a mobile device application, an email server, a wireless telephone service, a social media network, a web platform, and/or a web site user database. Moreover, the term "mobile consumer device" 120 may refer to, for example, a Personal Computer (PC), a mobile or laptop computer, a wireless telephone, a smartphone, a gaming device, a tablet computer, and/or an electronic book reader. According to some embodiments, the central platform 110 stores information about consumers, such as publication preferences associated with each consumer (e.g., indicating which comic book series are of particular interest) and/or purchase history information (e.g., indicating which comic books he or she has purchased in the past).

The central platform 110 is further in communication with a publication database 130. The publication database 130 may, for example, store information about recently issued publications, including comic book series identifiers, comic book characters, comic book illustrators, comic book authors, and/or comic book genres. The central platform 110 may also be in communication with a retailer apparatus 140 (e.g., a computer or database associated with a comic book stores) and/or third-party services 150 (e.g., the central platform 110 might communicate with mobile consumer device 120 via social networking web sites).

Some or all of the devices illustrated in FIG. 1 may be associated with Web browsers to access services and information provided by the central platform 110 via HyperText Transport Protocol (HTTP) communication and/or the Internet. For example, a consumer may manipulate a user interface of a mobile consumer device 120 to input information (e.g., "I am interested in the following comic book series . . . "). Examples of a Web client that might execute at a mobile consumer device 120 include, but are not limited to, a Web browser, an execution engine (e.g., JAVA, Flash, Silverlight) to execute associated code in a Web browser, and/or a dedicated standalone application.

Note that FIG. 1 represents a logical architecture for describing processes according to some embodiments, and actual implementations may include more or different elements arranged in other manners. Moreover, each system described herein may be implemented by any number of devices in communication via any number of other public and/or private networks. Two or more of the devices of may be co-located, may be a single device, or may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Figure 2:
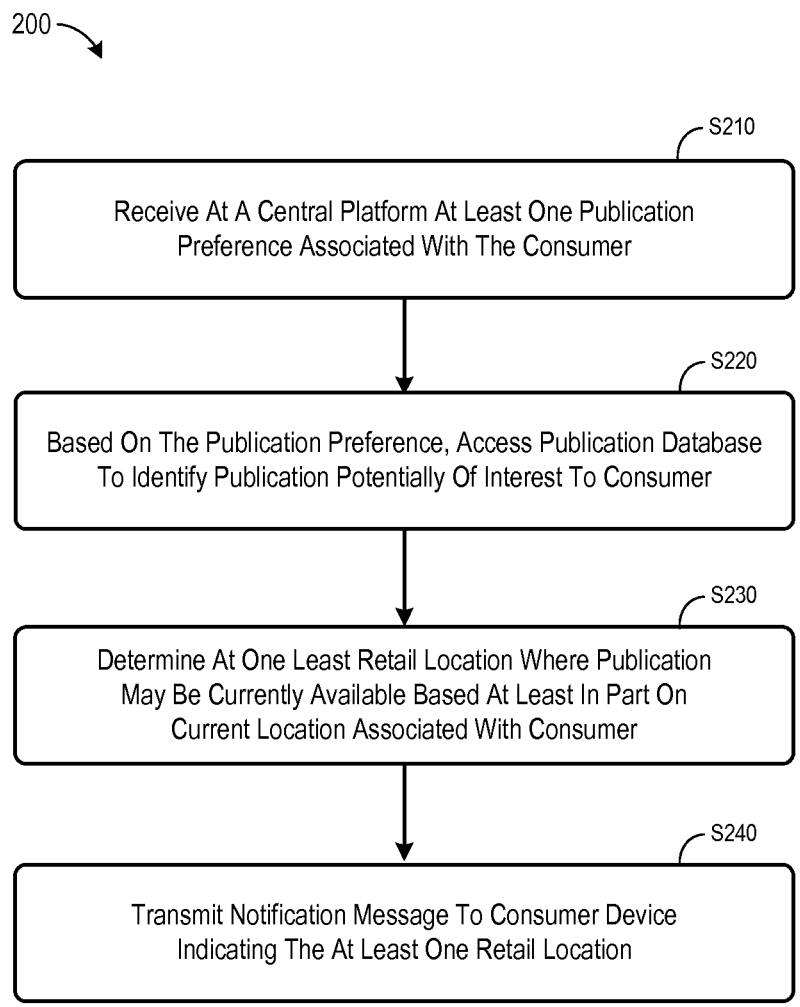
FIG. 2 is a flow diagram of a process in accordance with some embodiments.

FIG. 2 is a flow diagram of a process 200 that might be performed, for example, by the central platform 110 of FIG. 1 in accordance with some embodiments, but embodiments are not limited thereto. In this regard, all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments may be practiced in any order that is practicable.

The process 200 may be executed, for example, when information changes (e.g., a new comic books becomes available) or on a periodic basis (e.g., each night). At S210, the central platform 110 may receive at least one publication preference associated with a consumer. As used herein, a "publication" may refer to any printed fiction or non-fiction material, such as a comic book or graphic novel.

Figure 3:
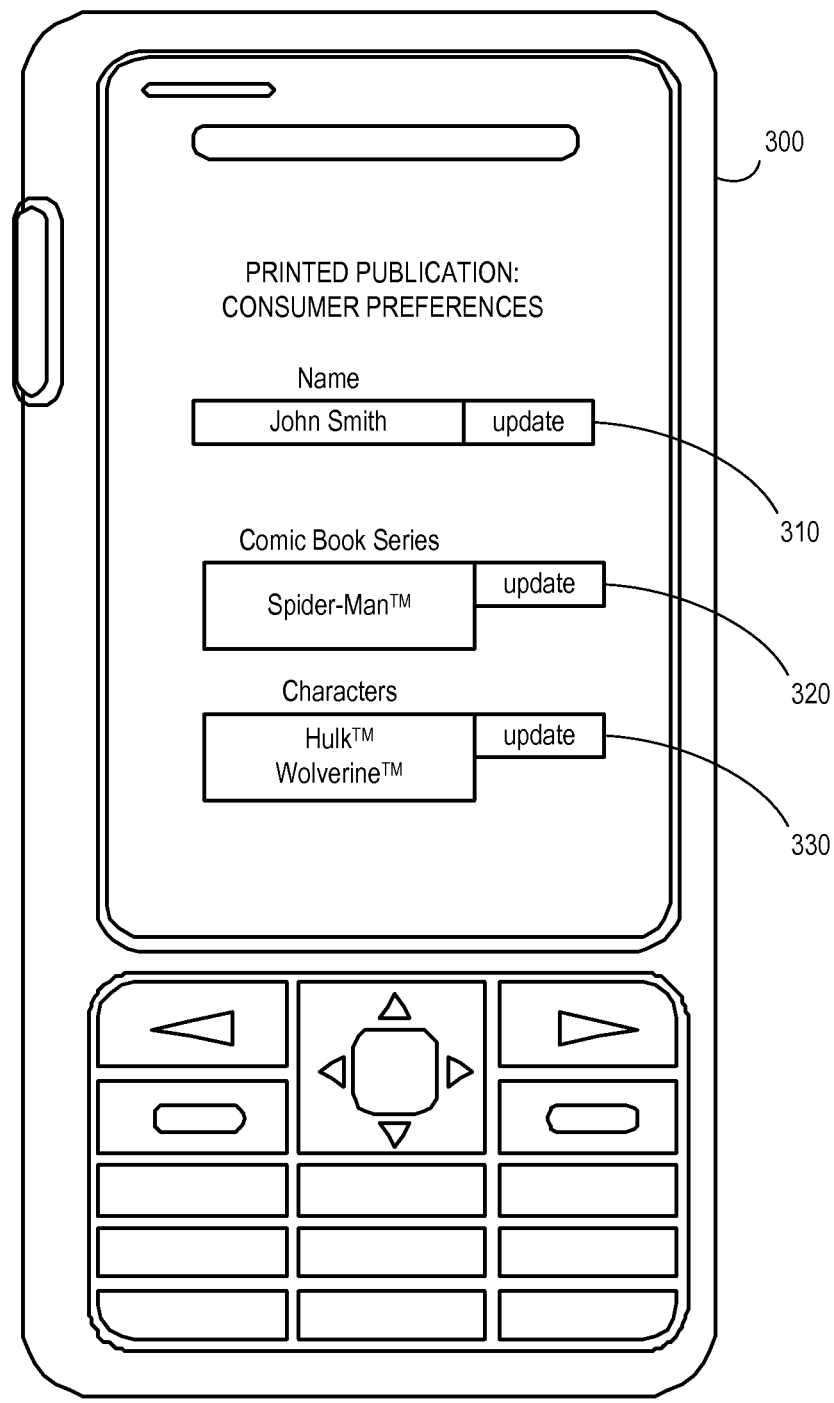
FIG. 3 is an example of a consumer preference display according to some embodiments described herein.

The publication preference might be, for example, associated with a comic book series, a comic book character, a comic book illustrator, a comic book author, and/or a comic book genre. For example, the consumer might access a web page associated with the central platform 110 and enter information about his or her favorite comic book series and/or comic book authors. FIG. 3 is an example of a consumer preference display 300 according to some embodiments described herein. In this example, the consumer may enter or select his or her name 310, favorite comic book series 320, and/or favorite comic book authors 330.

Referring again to FIG. 2, at S220 a publication database may be accessed to identify a publication potentially of interest to the consumer based on his or her publication preferences. For example, the publication database might store information about comic book series that are currently available at retail locations, including the series name and the characters featured in each issue. The central platform 110 may search through the printed publication database to find matches between available comic books and a particular consumer's preferences.

The identification of a publication potentially of interest to the consumer could also be based on a past purchase made by the consumer, whether in the form of a physical publication or in digital form. For example, if a consumer usually buys comic books written by a particular author, the central platform 110 may determine that a new comic book written by that author may be of interest that that consumer. As other examples, an identification of a publication potentially of interest to the consumer might be based on feedback information provided by the consumer (e.g., a customer review left on a web site), purchases made by other parties associated with the consumer (e.g., his or her friends on Facebook), trade show information, demographic information associated with the consumer (e.g., a particular comic book might be of interest to girls between the ages of 12 and 14), and/or pricing information.

At S230, at least one retail location where the identified publication may be currently available is determined. This information could be stored, for example, in the printed publication database or a separate retailer database. According to some embodiments, the retail location might be identified based on the types of comic books that are typically available from that store (e.g., and the retail location might or might not actually have a copy of the comic book current in stock). According to other embodiments, the retail location could be identified based on actual inventory information maintained by the retailer.

The determination may be, for example, based at least in part on a current location associated with the consumer. For example, a mobile consumer device 120 might transmit the current location of the consumer to the central platform 110. The central platform 110 could then identify retail locations that are physically proximate to the consumer (e.g., within a two mile or ten block radius). Note that the identified retail location could also be based on a current location of a retailer (e.g., a retailer who moves from one trade show location to another), a current location of the consumer device, and/or a distance preference associated with the consumer.

Note that S220 and/or S230 could be performed on a periodic basis, upon a change in the publication preference associated with the consumer, upon an update to the publication database, and/or upon a change in a current location associated with the consumer.

At S240, a notification message may be automatically transmitted to a consumer device associated with the consumer. The notification message may, for example, indicate the retail location determined at S230. As used herein, the term "automatically" may refer to an action that can be taken without human intervention. According to some embodiments, the notification message graphically indicates the at least one retail location on a map displayed on the consumer device.

According to some embodiments, the central platform 110 is remote from the consumer device. Note, however, that according to other embodiments at least a portion of the functionality of the central platform 110 incorporated within the consumer device. For example, the consumer preferences and publication database could be stored at the consumer device (which could then locally generate and display consumer notifications).

Accordingly, methods and mechanisms to provide automatic consumer notifications regarding printed publications and/or retail locations are described by some embodiments herein.

Figure 4:
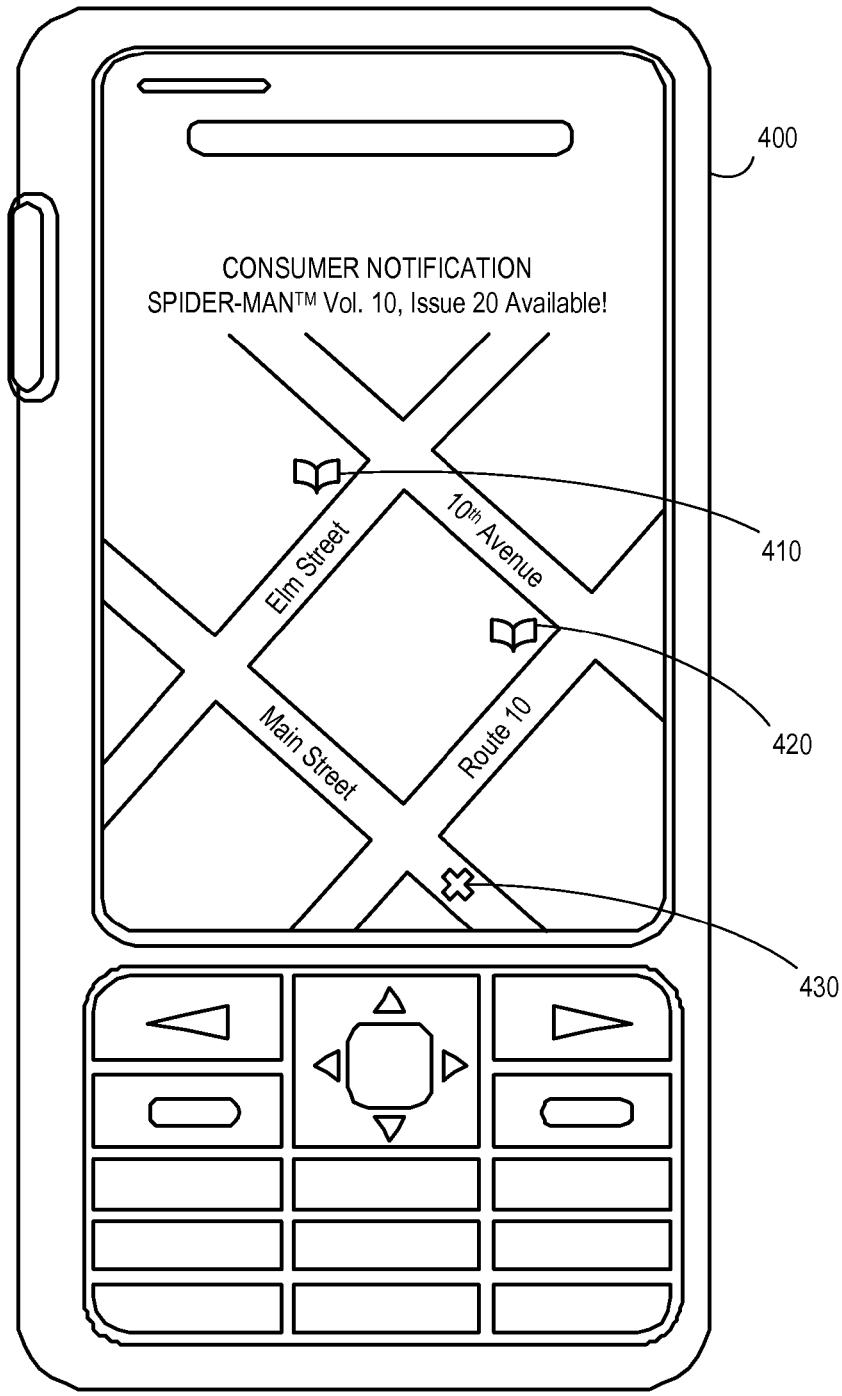
FIG. 4 is an example of a consumer notification display according to some embodiments described herein.

FIG. 4 is an example of a consumer notification display 400 according to some embodiments described herein. In this example, the display graphically indicates two retail locations 410, 420 on a map along with the consumer's current location 430. Note that, according to some embodiments the comic book potentially of interest to the consumer (e.g., Spider-Man™ in the display 400 of FIG. 4) might or might not be currently stocked at the retail locations 410, 420. According to other embodiments, the central platform 110 may instead determine a retail location where the identified publication is actually currently available based at least in part on inventory information received from a retailer apparatus.

Figure 5:
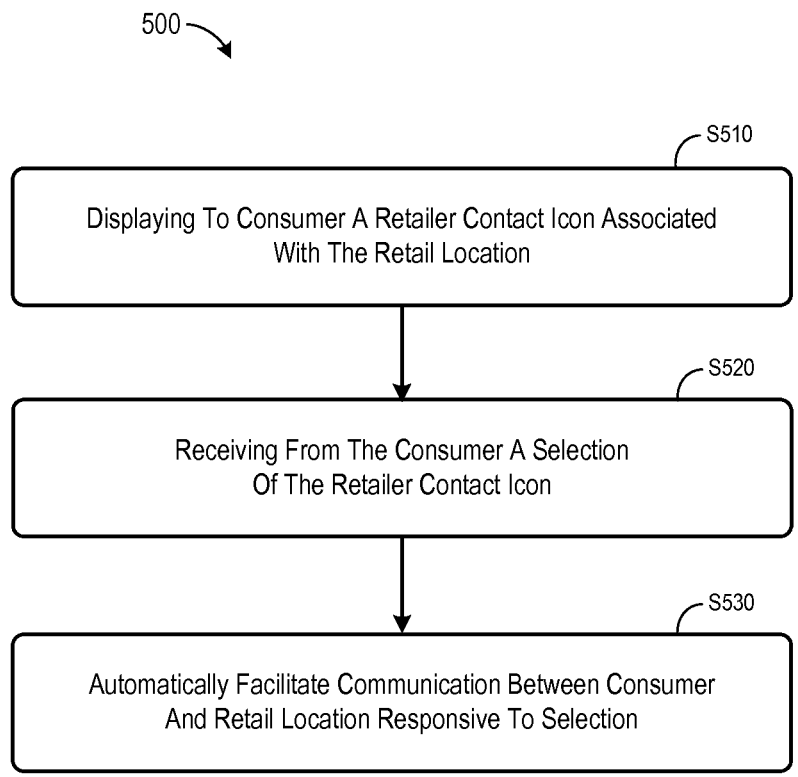
FIG. 5 is a flow diagram of a process in accordance with another embodiment.

When the central platform 110 is not aware of whether or not a particular retail location currently has a printed publication in stock, the notification transmitted to the consumer device might facilitate a communication directly between the consumer and the retail location. For example, FIG. 5 is a flow diagram of a process 500 in accordance with another embodiment. The process 500 might be performed, for example, by mobile consumer device or central platform 110.

Figure 6:
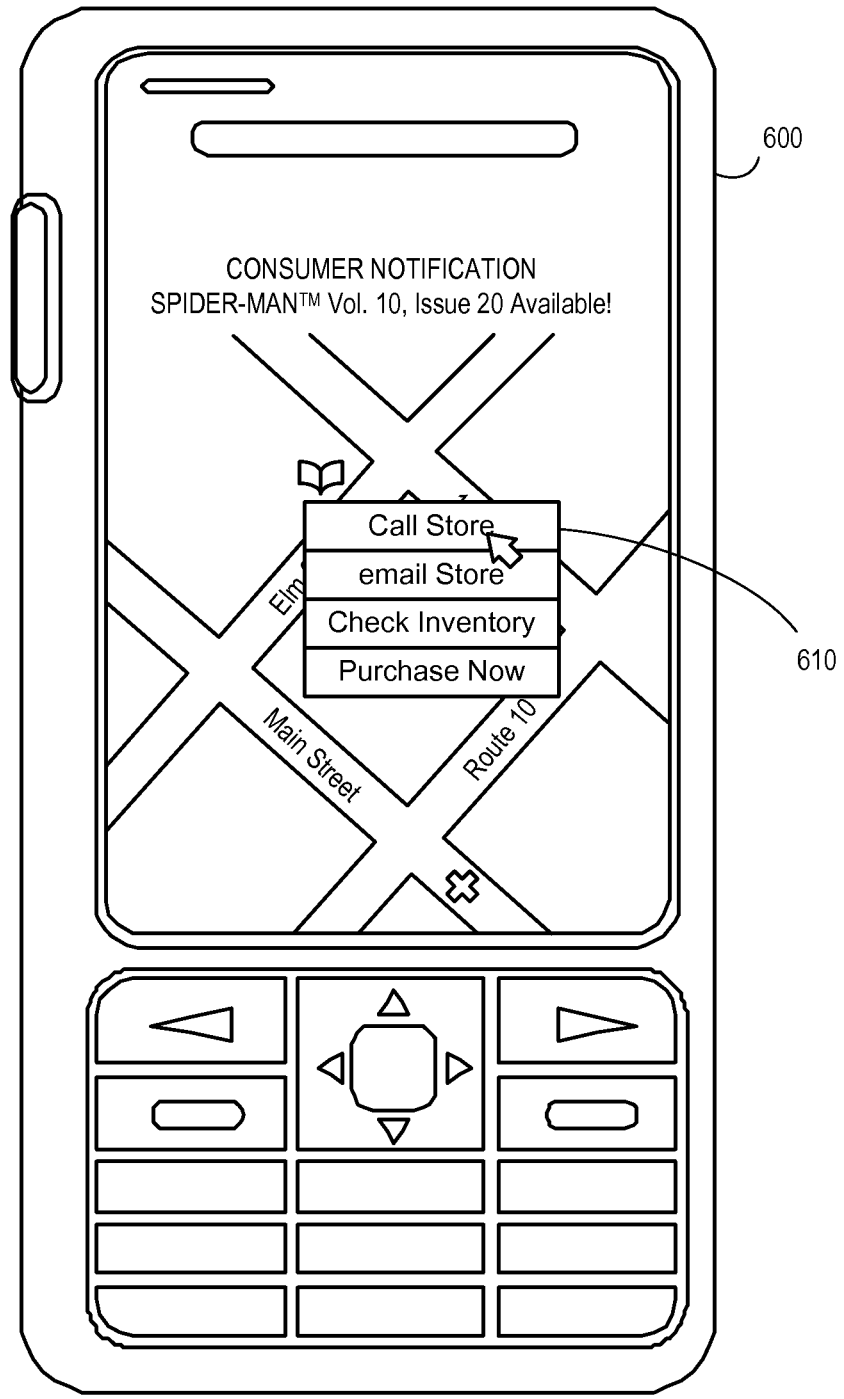
FIG. 6 is an example of a consumer notification display according to the embodiment of FIG. 5.

At S510, a retailer contact icon associated with the retail location might be graphically displayed to the consumer along with the notification message. For example, FIG. 6 is an example of a consumer notification display 600 including a "call store" icon 610. At S520, a selection of the retailer contact is received from the consumer (e.g., he or she may click or select the "call store" icon 610). At S530, a communication between the consumer and the retail location is automatically facilitated responsive to said selection. For example, when the consumer device is a wireless telephone or smartphone, a telephone call might be automatically placed to a phone number associated with the retail location (and the consumer can ask the retailer whether or not the comic book is currently in stock). According to other embodiments, the display 600 may also be used to email the store, check the store's inventory, and/or automatically facilitate a reservation or purchase by the consumer of the publication from the retail location (e.g., and he or she can then visit to the retail store to pick up the comic book).

Figure 7:
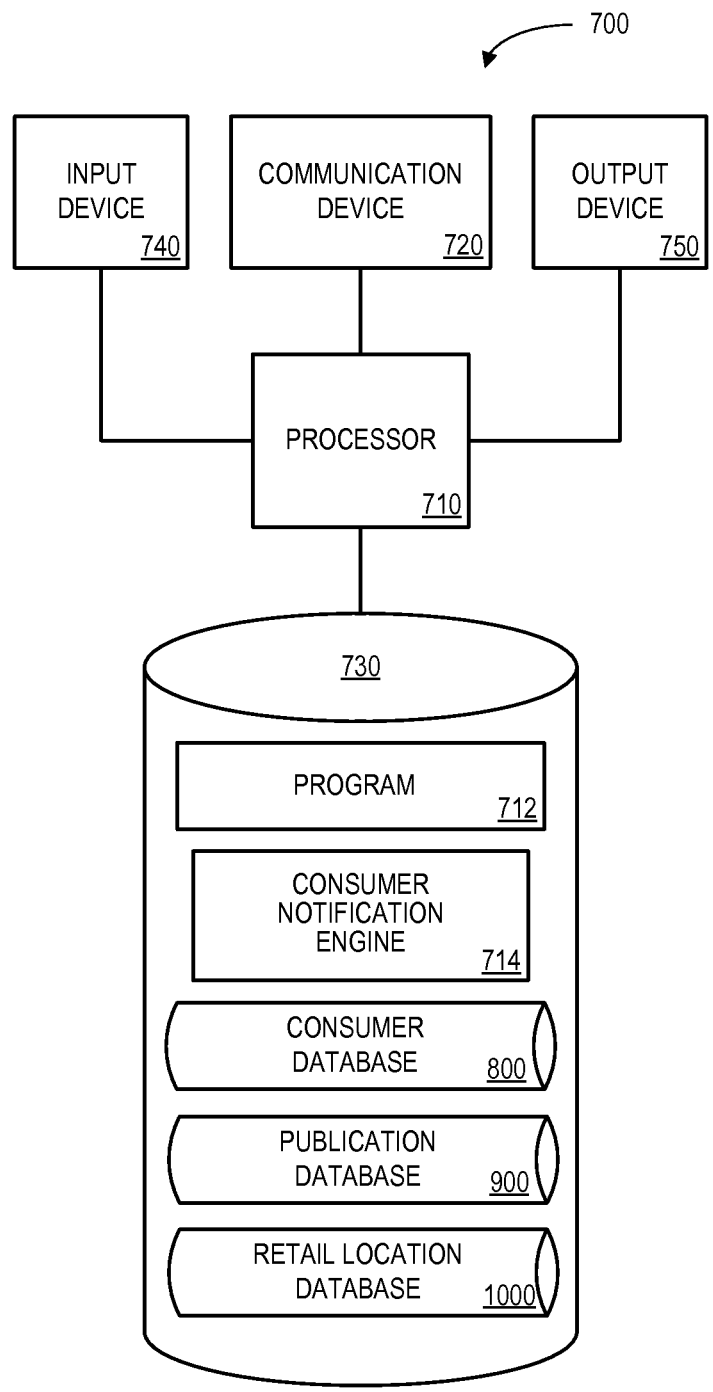
FIG. 7 is a block diagram of a central platform according to some embodiments.

FIG. 7 is a block diagram overview of a central platform 700 according to some embodiments. The central platform 700 may be, for example, associated with any of the devices described herein. The central platform 700 comprises a processor 710, such as one or more commercially available Central Processing Units (CPUs) in form of one-chip microprocessors, coupled to a communication device 720 configured to communicate via a communication network (not shown in FIG. 7). The communication device 720 may be used to communicate, for example, with one or more mobile consumer devices. The central platform 700 further includes an input device 740 (e.g., a mouse and/or keyboard to enter publication preference rules) and an output device 750 (e.g., a computer monitor to display reports to an administrator).

The processor 710 communicates with a storage device 730. The storage device 730 may comprise any appropriate information storage device, including combinations of magnetic storage devices (e.g., a hard disk drive), optical storage devices, and/or semiconductor memory devices.

The storage device 730 stores a program 712 and/or a consumer notification engine application 714 for controlling the processor 710. The processor 710 performs instructions of the programs 712, 714, and thereby operates in accordance with any of the embodiments described herein. For example, the processor 710 may receive one or more publication preferences associated with a consumer via the communication device 720. Based on the publication preferences, the processor 710 may access a publication database 900 to identify a publication potentially of interest to the consumer. At least one retail location where the identified publication may be currently available can be determined by the processor 710 based at least in part on a current location associated with the consumer. A notification message may then be transmitted by the processor 710 to a consumer device to indicate the publication and at least one retail location.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the central platform 700 from another device; or (ii) a software application or module within the central platform 700 from another software application, module, or any other source.

In some embodiments (such as shown in FIG. 7), the storage device 730 stores a consumer database 800, the publication database 900, and a retail location database 1000. Examples of databases 800, 900, 1000 that may be used in connection with the central platform 700 will now be described in detail with respect to FIGS. 8 through 10.

Figure 8:
FIG. 8 is a portion of a consumer database that may be stored according to some embodiments.

Referring to FIG. 8, a table is shown that represents the consumer database 800 that may be stored at and/or accessed by the central platform 110 according to some embodiments. The table may include, for example, entries identifying consumers who have purchased publications. The table may also define fields 802, 804, 806, 808, 810 for each of the entries. The fields 802, 804, 806, 808, 810 may, according to some embodiments, specify: a consumer identifier 802, a consumer communication address 804, a consumer location 806, publication preferences 808, and past purchases 810. The information in the consumer database 800 may be created and updated, for example, based on information received from a consumer (e.g., information entered or selected via a web page or application interface).

The consumer identifier 802 may be, for example, an alphanumeric code associated with a particular consumer (e.g., a user name). The consumer communication address 804 might be, for example, a telephone number, Internet Protocol (IP) address, email address, social network account, or any other type of communication address. The consumer location 806 might be an address, a latitude/longitude, a wireless telephone tower identifier, or any other information that can define a consumer's present location. The publication preferences 808 might include publication identifiers or publication series identifiers or titles. The past purchases 810 might indicate publications that have recently been purchased by the consumer.

Figure 9:
FIG. 9 is a portion of a publication database that may be stored according to some embodiments.

Referring to FIG. 9, a table is shown that represents the publication database 900 that may be stored at and/or accessed by the central platform 110 according to some embodiments. The table may include, for example, entries identifying printed publication that may be available for purchase. The table may also define fields 902, 904, 906, 908, 910 for each of the entries. The fields 902, 904, 906, 908, 910 may, according to some embodiments, specify: a publication identifier 902, a publication series 904, publication characters 906, a publication author/illustrator 908, and a publication genre 910. The information in the publication database 900 may be created and updated, for example, based on information received from a publisher on a periodic basis.

The publication identifier 902 may be, for example, an alphanumeric code associated with a particular printed publication. The publication series 904 might indicate, for example, a comic book series associated with the publication. The publication characters 906, the publication author/illustrator 908, and publication genre 910 might further define the printed publication. Note that some or all of the identifiers in the publication database might be based on or otherwise associated with the identifiers used in the consumer database 800.

Figure 10:
FIG. 10 is a portion of a retail location database that may be stored according to some embodiments.

Referring to FIG. 10, a table is shown that represents the retail location database 1000 that may be stored at and/or accessed by the central platform 110 according to some embodiments. The table may include, for example, entries identifying retailers who may stock printed publications. The table may also define fields 1002, 1004, 1006, 1008, 1010 for each of the entries. The fields 1002, 1004, 1006, 1008, 1010 may, according to some embodiments, specify: a retailer identifier 1002, a retailer address 1004, a retailer communication address 1006, what the retailer normally stocks 1008, and current inventory 1010. The information in the retail location database 1000 may be created and updated, for example, based on information received from a retailer.

The retailer identifier 1002 may be, for example, an alphanumeric code associated with a particular retail location (e.g., a comic book store). The retailer address 1004 might define where the store is located. The retailer communication address 1006 might be, for example, a telephone number, IP address, email address, social network account, or any other information that may be used to facilitate a communication between a consumer and the retail location. What the retailer normally stocks 1008 might be based on past purchase orders submitted to a publisher while the current inventory 1010 might indicate the printed publications that are currently on the shelves at the retail location.

Thus, some embodiments described herein may provide automatic consumer notifications regarding printed publications and/or retail locations.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to comic books, note that embodiments may be associated with other types of printed publications. For example, magazines, newspapers, journals and other types of printed material may be associated with embodiments described herein.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method of facilitating a purchase of a printed publication by a consumer, comprising:
   receiving at a central platform that includes a processor, at least one publication preference associated with the consumer;
   based on the publication preference, accessing, by the central platform, a publication database to identify a publication potentially of interest to the consumer;
   determining, by the central platform, at least one retail location where the identified publication may be currently available, wherein said determining is based at least in part on a current location associated with the consumer; and
   transmitting, by the central platform, a notification message to a consumer device associated with the consumer, the notification message indicating the at least one retail location;
   wherein said determining at least one retail location where the identified publication may be currently available is performed upon an update to the publication database.

2. The method of claim 1, wherein the publication comprises a comic book.

3. The method of claim 2, wherein the publication preference is associated with at least one of: (i) a comic book series, (ii) a comic book character, (iii) a comic book illustrator, (iv) a comic book author, or (v) a comic book genre.

4. The method of claim 1, wherein the central platform is associated with at least one of: (i) a mobile device application, (ii) an email server, (iii) a wireless telephone service, (iv) a social media network, (v) a web platform, or (vi) a web site user database.

5. The method of claim 1, wherein the identification of the publication potentially of interest to the consumer is further based on at least one of: (i) purchases made by other parties associated with the consumer, or (ii) trade show information.

6. The method of claim 1, wherein the at least one retail location is further determined based on a distance preference associated with the consumer.

7. The method of claim 1, wherein the notification message graphically indicates the at least one retail location on a map displayed on the consumer device.

8. The method of claim 1, wherein said determining is performed at least one of: (i) on a periodic basis, (ii) upon a change in the publication preference associated with the consumer, or (iii) upon a change in a current location associated with the consumer.

9. The method of claim 1, wherein the consumer device is associated with at least one of: (i) a personal computer, (ii) a mobile computer, (iii) a wireless telephone or smartphone, (iv) a gaming device, (v) a tablet computer, or (vi) an electronic book reader.

10. The method of claim 1, further comprising:
    displaying to the consumer a retailer contact icon associated with the retail location;
    receiving from the consumer a selection of the retailer contact icon; and
    automatically facilitating a communication between the consumer and the retail location responsive to said selection.

11. The method of claim 10, further comprising:
    automatically facilitating a purchase by the consumer of the publication from the retail location.

12. The method of claim 1, wherein said determining comprises:
    determining a retail location where the identified publication is currently available based at least in part on inventory information received from a retailer apparatus.

13. The method of claim 1, wherein the central platform is remote from the consumer device.

14. The method of claim 1, wherein at least a portion of the functionality of the central platform is incorporated within the consumer device.

15. A non-transitory computer-readable medium storing program code executable by a computer to:
    receiving at a central platform at least one comic book preference associated with a consumer;
    based on the comic book preference, accessing a comic book database to identify a comic book potentially of interest to the consumer;
    determining at least one retail location where the identified comic book is currently available, wherein said determining is based at least in part on a current location associated with the consumer;
    transmitting a notification message to a consumer device associated with the consumer, the notification message indicating the at least one retail location;
    displaying to the consumer a retailer contact icon associated with the retail location;
    receiving from the consumer a selection of the retailer contact icon; and
    automatically facilitating a communication between the consumer and the retail location responsive to said selection;
    wherein said determining at least one retail location where the identified comic book is currently available is performed upon an update to the publication database.

16. The medium of claim 15, wherein the central platform is associated with at least one of: (i) a mobile device application, (ii) an email server, (iii) a wireless telephone service, (iv) a social media network, (v) a web platform, or (vi) a web site user database.

17. The medium of claim 16, wherein the identification of the comic book potentially of interest to the consumer is further based on at least one of: (i) purchases made by other parties associated with the consumer, or (ii) trade show information.

18. The medium of claim 17, wherein the notification message graphically indicates the at least one retail location on a map displayed on the consumer device.

19. A system, comprising:
   a consumer database storing publication preference information associated with a plurality of consumers;
   a publication database storing information about a plurality of publications;
   a retailer database storing information about a plurality of retail locations; and
   a central platform that includes a processor and is coupled to the consumer database, the publication database, and the retailer database, the central platform being adapted to:
      identify a publication potentially of interest to a first consumer based on information in the consumer database and information in the publication database;
      determine at least one retail location where the identified publication may be currently available based on information in the retailer database and a current location associated with the consumer; and
      transmit a notification message to a consumer device associated with the first consumer, the notification message indicating the at least one retail location;
      wherein said determine at least one retail location where the identified publication may be currently available is performed upon an update to the publication database.

20. The system of claim 19, wherein the notification message is transmitted via a third-party service.

21. A non-transitory computer-readable medium storing program code executable by a computer to:
   receiving at a central platform at least one comic book preference associated with a consumer;
   based on the comic book preference, accessing a comic book database to identify a comic book potentially of interest to the consumer;
   determining at least one retail location where the identified comic book is currently available, wherein said determining is based at least in part on a current location associated with the consumer;
   transmitting a notification message to a consumer device associated with the consumer, the notification message indicating the at least one retail location;
   displaying to the consumer a retailer contact icon associated with the retail location;
   receiving from the consumer a selection of the retailer contact icon; and
   automatically facilitating a communication between the consumer and the retail location responsive to said selection;
   wherein the notification message graphically indicates the at least one retail location on a map displayed on the consumer device.

* * * * *